Figure 2:
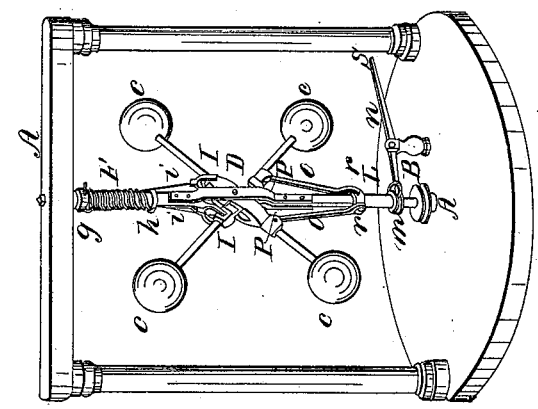

T. Silver,
Governor.

Nº 13,202.    Patented July 3, 1855.

UNITED STATES PATENT OFFICE.

THOMAS SILVER, OF PHILADELPHIA, PENNSYLVANIA.

MARINE-STEAM-ENGINE GOVERNOR.

Specification of Letters Patent No. 13,202, dated July 3, 1855.

*To all whom it may concern:*

Be it known that I, THOMAS SILVER, of the city of Philadelphia and State of Pennsylvania, have invented a new method of arranging governors for the regulation of the motion of steam-engines, being adaptable equally to those of a stationary character and those subject to promiscuous angular positions, as marine engines are liable to on high seas; and I do hereby declare that the following is a full and exact description thereof, reference being had to the accompanying drawings and letters of reference marked thereon.

The nature of my invention consists in the combined arrangement of two bars or shafts, bearing on either end, vanes or centrifugal balls, or any equivalent of equal weight or resistance, resting at the center on an axle in the clevis of a pillar, which is intended to revolve by means of motion transmitted from the engine (said pillar may be fixed in any angular position to a given plane to suit convenience) and a spring or springs so adjusted that, when the instrument is not in motion, the bars or shafts are drawn toward a line with the pillar, and when in motion, thrown transversely thereto, by the centrifugal force of the balls, or atmospheric contact of the vanes, or equivalent resistance.

For the regulation of stationary engines, a single bar or shaft, bearing on either end balls or vanes as aforesaid, with a spring properly adjusted to the axle, will form a more sensitive governor than any in known use and can be constructed at much less expense. But it is a well known principle, that when a body is put in motion, that it is inclined to continue in the orbit or plane in which its motion commences. Therefore, to make my instrument more perfectly adaptable to marine engines, which are subject frequently in rough seas to sudden throws or oscillations, I arrange transversely to each other and on the same axle at the center and connected with the same spring, two bars or shafts, bearing balls or vanes as aforesaid, which are also connected or attached to a sliding collar, having at the bearings thereof, friction rollers that traverse on the pillar which supports said bars and balls or vanes, thereby, under all circumstances of position, conforming the orbits of the balls or vanes to the plane of the center around which they revolve, which insures a correct transmission of motion to the steam or regulating valve.

To enable others to better understand and use my invention, I refer to the drawing annexed.

Figures 3, 4:
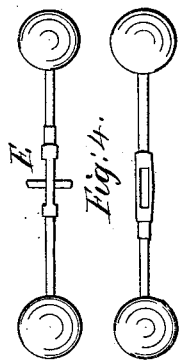
Figure 1:
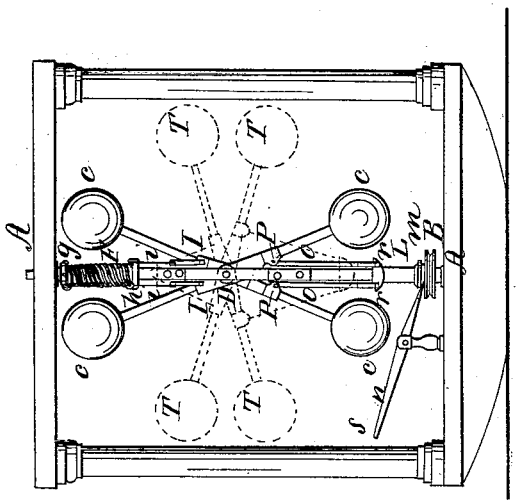
Figure 5:
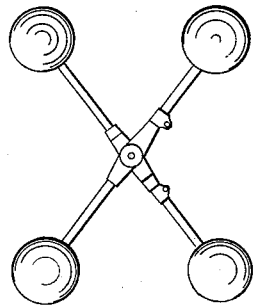

Figure 1 represents the instrument when not in motion. Fig. 2 the same when in motion. Figs. 3 and 4 represent male and female bars, or shafts, which are fitted transversely together, as represented in Fig. 5.

A, A, Figs. 1 and 2 represent a pillar intended to revolve by means of motion transmitted from an engine to pulley wheel B, Figs. 1 and 2.

C, C, C, C, Figs. 1 and 2, represent centrifugal balls, of equal weight or force on either end of bars or shafts, resting at the center D Figs. 1 and 2, on an axle or pinion as represented at E Fig. 3.

F, Figs. 1 and 2, represents a spiral spring traversing on pillar A, A, Figs. 1 and 2, and connected at one end to collar, $g$, and at the opposite end to sliding collar, $h$, Figs. 1 and 2. The collar, $g$, can be moved in order to tighten or ease the spring F, by withdrawing a pin which sustains it to pillar A, A.

$i, i$, Figs. 1 and 2, represent connecting wires and loops which confine the sliding collar, $h$, to the transversely fixed bars at I, I, Figs. 1 and 2.

L, L, Figs. 1 and 2, representing a sliding collar with a universal slot or groove at $m, m$, Figs. 1 and 2, which receives converging points in a crotch of rock shaft, $n$, Figs. 1 and 2.

$o, o$, Figs. 1 and 2, represent rods connected at $p, p$, to the transversely fixed bars and balls C, C, C, C, Figs. 1 and 2, and at $q, q$, to sliding collar L, resting upon friction rollers $r, r$, Figs. 1 and 2.

Imaginary line T, T, T, T, Fig. 1, represents the position of the centrifugal force, when the instrument is operating under its greatest velocity.

It will be seen from the above description, that the balls or equivalent C, C, C, C, Figs. 1 and 2, form an equilibrium or balance, that by force of the spring F, the bars or shafts when not in motion, are drawn as nearly as possible in a line with the pillar A, A, Figs. 1 and 2, on which they rest, but when motion is transmitted from the engine to pulley wheel B, the bars, and balls or vanes are thrown transversely to the pillar A, A, Figs. 1 and 2, which gives motion to the sliding collar L, in proportion to the velocity of the engine, whereby rock shaft *n*, being connected at *s*, with the steam valve, regulates the flow of steam under all circumstances of position previously described with equal correctness.

In the arrangement of my marine engine governor, I do not claim as a novelty the introduction of a spring, as that plan has been adopted, for the purpose of collapsing or contracting centrifugal balls to the center of a horizontal plane, in governors operating in a vertical or fixed position. I am also aware that a single bar with a centrifugal ball on either end and resting at the center has been proposed; that the pillar or shaft, on which it rests, may be placed horizontally for the purpose of transmitting more readily the motion of the engine, the principle of its action being that of ordinary governors, and having no spring.

What I claim as my improvement in governors is—

The employment of two oscillating balanced bars in combination with the spindle and spring or any equivalent substitute therefor in such combination the whole being constructed and arranged as herein set forth.

THOS. SILVER.

Witnesses:
JOHN SMYLIE, Jr.,
JAS. W. HARRISON.